(12) United States Patent
Saito et al.

(10) Patent No.: US 8,694,495 B2
(45) Date of Patent: Apr. 8, 2014

(54) INFORMATION PROCESSING DEVICE, INFORMATION PROCESSING TERMINAL, INFORMATION PROCESSING METHOD, AND PROGRAM

(75) Inventors: Mari Saito, Kanagawa (JP); Noriyuki Yamamoto, Kanagawa (JP); Mitsuhiro Miyazaki, Kanagawa (JP); Yasuharu Asano, Kanagawa (JP); Tatsuki Kashitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 12/325,378

(22) Filed: Dec. 1, 2008

(65) Prior Publication Data

US 2009/0144225 A1   Jun. 4, 2009

(30) Foreign Application Priority Data

Dec. 3, 2007   (JP) ................. P2007-312569

(51) Int. Cl.
*G06F 7/00*   (2006.01)
*G06F 17/30*   (2006.01)

(52) U.S. Cl.
USPC ........................... 707/732; 707/751; 707/713

(58) Field of Classification Search
USPC ....................................................... 707/636
See application file for complete search history.

(56) References Cited

U.S. PATENT DOCUMENTS

| | | | | |
|---|---|---|---|---|
| 5,226,177 | A * | 7/1993 | Nickerson | 725/24 |
| 7,809,601 | B2 * | 10/2010 | Shaya et al. | 705/10 |
| 2004/0117814 | A1 * | 6/2004 | Roye | 725/9 |
| 2005/0289582 | A1 * | 12/2005 | Tavares et al. | 725/10 |
| 2008/0201370 | A1 * | 8/2008 | Kemp et al. | 707/104.1 |
| 2009/0271417 | A1 * | 10/2009 | Toebes et al. | 707/100 |

FOREIGN PATENT DOCUMENTS

| | | |
|---|---|---|
| JP | 2005-032167 | 2/2005 |
| JP | 2007-207153 | 8/2007 |
| JP | 2005-142975 | 6/2008 |

OTHER PUBLICATIONS

Paul Resnick et al., "GroupLens" An Open Architecture for Collaborative Filtering of Netnews, Proceedings of ACM 1994 Conference on Computer Supported Cooperative Work, Chapel Hill, NC: pp. 175-186, 1994, Association for Computing Machinery.

* cited by examiner

*Primary Examiner* — Jeffrey A Burke
(74) *Attorney, Agent, or Firm* — Finnegan, Henderson, Farabow, Garrett & Dunner, L.L.P.

(57) ABSTRACT

An information processing device is connected to multiple information processing terminals wherein multiple types of expressions exhibited by a user during playback of content are detected, evaluation of each played-back content is obtained, of the detected plurality of types of expressions a predetermined expression serving as a high evaluation index indicated by the user during playback of high evaluation content is identified, and the expression information serving as a identified high evaluation index and the information expressing evaluation as to each content are transmitted. The information device includes a receiving unit to receive expression information serving as the high evaluation index from multiple information processing terminals; a user identifying unit to identify a user indicating an expression of similar high evaluation index for the same content; a recommended content identifying unit to identify recommended content having a high evaluation to other similar users; and a transmitting unit.

14 Claims, 15 Drawing Sheets

| | EVALUATION | SMILING | FROWNING | CLAPPING | TALKING TO ONESELF | ... |
|---|---|---|---|---|---|---|
| CONTENT A | 5 | ⌢ | ⌣ | ∪ | ⌢ | ... |
| CONTENT B | 2 | ⌣⌢ | ⌢ | ⌒ | ⌣ | ... |
| CONTENT C | 3 | ⌝ | ⌢ | ⌢⌢ | ⌣ | ... |
| CONTENT D | 5 | ⌝ | ⌢ | ⌢ | ⌒ | ... |
| CONTENT E | 4 | ⌣⌢ | ⌢ | ⌢ | ⌝ | ... |
| ⋮ | ⋮ | ⋮ | ⋮ | ⋮ | ⋮ | ... |

FIG. 4

| | EVALUATION | SMILING | FROWNING | CLAPPING | TALKING TO ONESELF | ... |
|---|---|---|---|---|---|---|
| CONTENT A | 5 | ⟨ | ⟩ | ⟩ | ⟩ | ... |
| CONTENT B | 2 | ⟩ | ⟨ | ⟨ | ⟩ | ... |
| CONTENT C | 3 | ⟩ | ⟨ | ⟩ | ⟩ | ... |
| CONTENT D | 5 | ⟩ | ⟩ | ⟩ | ⟨ | ... |
| CONTENT E | 4 | ⟩ | ⟩ | ⟨ | ⟨ | ... |
| ... | ... | ... | ... | ... | ... | ... |

FIG. 5

|  | USER 1 | USER 2 | USER 3 | USER 4 | USER 5 |
|---|---|---|---|---|---|
| CONTENT A | ○ | ○ | ○ | × |  |
| CONTENT B | × |  |  | ○ |  |
| CONTENT C |  |  |  | ○ | ○ |
| CONTENT D | ○ | ○ | ○ | × |  |
| CONTENT E |  | ○ | ○ |  |  |
| CONTENT F |  | × | × |  | ○ |
| CONTENT G |  |  | ○ |  | ○ |

INFORMATION PROCESSING DEVICE, INFORMATION PROCESSING TERMINAL, INFORMATION PROCESSING METHOD, AND PROGRAM

CROSS REFERENCES TO RELATED APPLICATIONS

The present invention contains subject matter related to Japanese Patent Application JP 2007-312569 filed in the Japanese Patent Office on Dec. 3, 2007, the entire contents of which are incorporated herein by reference.

BACKGROUND OF THE INVENTION

1. Field of the Invention

The present invention relates to an information processing device, information processing terminal, information processing method, and program, and particularly relates to an information processing device, information processing terminal, information processing method, and program wherein content recommendation can be made taking into consideration expressions during viewing/listening.

2. Description of the Related Art

There is a technique wherein, based on purchasing history and activity history of multiple users, other users exhibiting reactions similar to a target user can be identified, and from histories of identified other users, content which the target user has not experienced can be recommended to the target user. Such a technique is called Collaborative Filtering. (See P. Resnick, N. Iacovou, M. Suchak, P. Bergstrom, and J. Reid, 1. "Group Lens?: Open Architecture for Collaborative Filtering of Netnews" Conference on Computer Supported Cooperative Work, pp. 175-186, 1994). Thus, a target user can receive recommendations for content that the target user himself has not viewed or listened to, and that other users exhibiting similar reactions to have purchased and evaluated highly.

SUMMARY OF THE INVENTION

Collaborative filtering is effective for decision-making by a user such as for product purchases, but is not necessarily effective for recommending an item such as content, of which the reaction of the user using such item changes in a time-series manner.

For example, the reaction of another user serving as a basis when selecting recommended content is a finalized reaction as to the content such as "like", "neither like nor dislike", and "dislike", and how the finalized reaction to the content is reached, such as which portion of the content is liked and which portion is disliked, is not taken into consideration.

Also, the expression of the user viewing/listening to the content is easily influenced by context (situations), such as that in the case of viewing/listening to the content in a situation where multiple users are in a home living room, the user may laugh more, or in the case of viewing/listening to the content by oneself, the user may talk to himself more, but these are also not taken into consideration.

If collaborative filtering is performed while taking into account how the user reached the finalized reaction to the content or the expressions during viewing/listening to the content, and recommendation of the content can be performed, we can say that the collaborative filtering is effectively employed for providing recommendations.

It has been recognized that there is demand for enabling content recommendations while taking into consideration user expressions during viewing/listening.

According to an embodiment of the present invention, an information processing device connected to multiple information processing terminals wherein multiple types of expressions exhibited by a user during playback of content are detected, evaluation of each played-back content is obtained, of the detected plurality of types of expressions a predetermined expression serving as a high evaluation index indicated by the user during playback of high evaluation content is identified, and the expression information serving as a identified high evaluation index and the information expressing evaluation as to each content are transmitted, includes: a receiving unit configured to receive expression information serving as the high evaluation index, which is transmitted from a plurality of the information processing terminals and information expressing evaluation as to each content; a user identifying unit configured to identify a user indicating an expression of similar high evaluation index for the same content, based on an expression serving as the high evaluation index expressed with information received by the receiving unit; a recommended content identifying unit configured to identify as recommended content, that content which is identified by the user identifying unit and which has a high evaluation to other users exhibiting high evaluation index expressions similar to the user requesting content recommendation, based on an evaluation expressed with information received by the receiving unit; and a transmitting unit configured to transmit the identified recommended content information identified by the recommended content identifying unit to an information processing terminal used by the user requesting content recommendation.

The receiving unit may be arranged to further receive information expressing viewing/listening history of content which is transmitted from the multiple information processing terminals, and wherein the recommended content identifying unit identifies content as recommended content which the user requesting content recommendation has not experienced and which is high evaluation content for the other users.

The user identifying unit may be arranged to further identify a user with similar evaluations, based on evaluations as to the content of users for each information processing terminal, which is expressed by information received from the receiving unit.

The recommended content identifying unit may be arranged to further reference and identify a high evaluation portion of an entire high evaluation content for a user with similar evaluation of content to expression of the high evaluation index of a user exhibiting similar high evaluation index expressions for the high evaluation content.

The receiving unit may be arranged to receive expression information serving as the high evaluation index for each context during playback of content identified by the multiple information processing terminals transmitted from the multiple information processing terminals, and information showing evaluation as to each content, and wherein the user identifying unit identifies a user exhibiting similar high evaluation index expression for the same content, based on an expression serving as the high evaluation index for every context.

According to an embodiment of the present invention, an information processing method or program includes the steps of: receiving expression information serving as a high evaluation index, which is transmitted from multiple information processing terminals and information expressing evaluation as to each content; identifying a user indicating an expression of similar high evaluation index for the same content, based on an expression serving as the high evaluation index expressed with received information; identifying as recommended content, content which has a high evaluation to other users exhibiting high evaluation index expressions similar to the user requesting content recommendation, based on an evaluation expressed with received information; and transmitting the identified recommended content information to an information processing terminal used by the user requesting content recommendation.

According to the above configuration, an arrangement may be made wherein information of expression serving as high evaluation index which is transmitted from multiple information processing terminals and information expressing an evaluation as to each content is received, and a user exhibiting similar high evaluation index expressions for the same content is identified, based on the expression serving as the high evaluation index expressed by the received information. Also, content of a high evaluation to other users exhibiting similar high evaluation index expressions as the identified user requesting the content recommendation is identified as recommended content based on the evaluation expressed with the received information, and the recommended content information is transmitted to the information processing terminal which the user requesting content recommendation uses.

According to an embodiment of the present invention, an information processing terminal includes: an expression detecting unit configured to detect multiple types of expressions exhibited by a user during content playback; a identifying unit configured to obtain evaluation of each content that has been played back, and of the multiple types of expressions detected by the expression detecting unit, to identify a predetermined expression serving as a high evaluation index exhibited by a user during playback of high evaluation content; and a transmitting unit configured to transmit expression information serving as a high evaluation index identified by the identifying unit and information expression evaluation as to each content.

The information processing terminal may further include: a receiving unit configured to receive recommended content information transmitted from the information processing device; and a recommending unit displaying recommended content to a user, based on information received by the receiving unit.

The information processing terminal may further include a context identifying unit configured to identify context during content playback. The identifying unit may identify a predetermined expression serving as a high evaluation index exhibited by the user during playback of high evaluation content, from multiple types of expressions for each context identified by the context identifying unit.

According to an embodiment of the present invention, an information processing method includes the steps of: detecting multiple types of expressions exhibited by a user during content playback; obtaining an evaluation for each played-back content; identifying a predetermined expression serving as a high evaluation index exhibited by the user during playback of high evaluation content, from the detected multiple types of expressions; and transmitting expression information serving as identified high evaluation index and information expressing an evaluation as to each content, to an information processing device.

According to the above configuration, an arrangement may be made wherein multiple types of expressions exhibited by a user during content playback are detected and an evaluation for each played-back content is obtained. Also, a predetermined expression serving as a high evaluation index exhibited by the user during playback of high evaluation content is identified from the detected multiple types of expressions; and expression information serving as identified high evaluation index and information expressing an evaluation as to each content are transmitted to an information processing device.

According to the above configuration, content recommendation can be performed with consideration for expressions during content playback.

BRIEF DESCRIPTION OF THE DRAWINGS

FIG. 4 is a diagram illustrating an example of information stored in an expression information database;

FIG. 5 is a diagram illustrating an example of user evaluation and viewing/listening history as to content;

DESCRIPTION OF THE PREFERRED EMBODIMENTS

Figure 1:
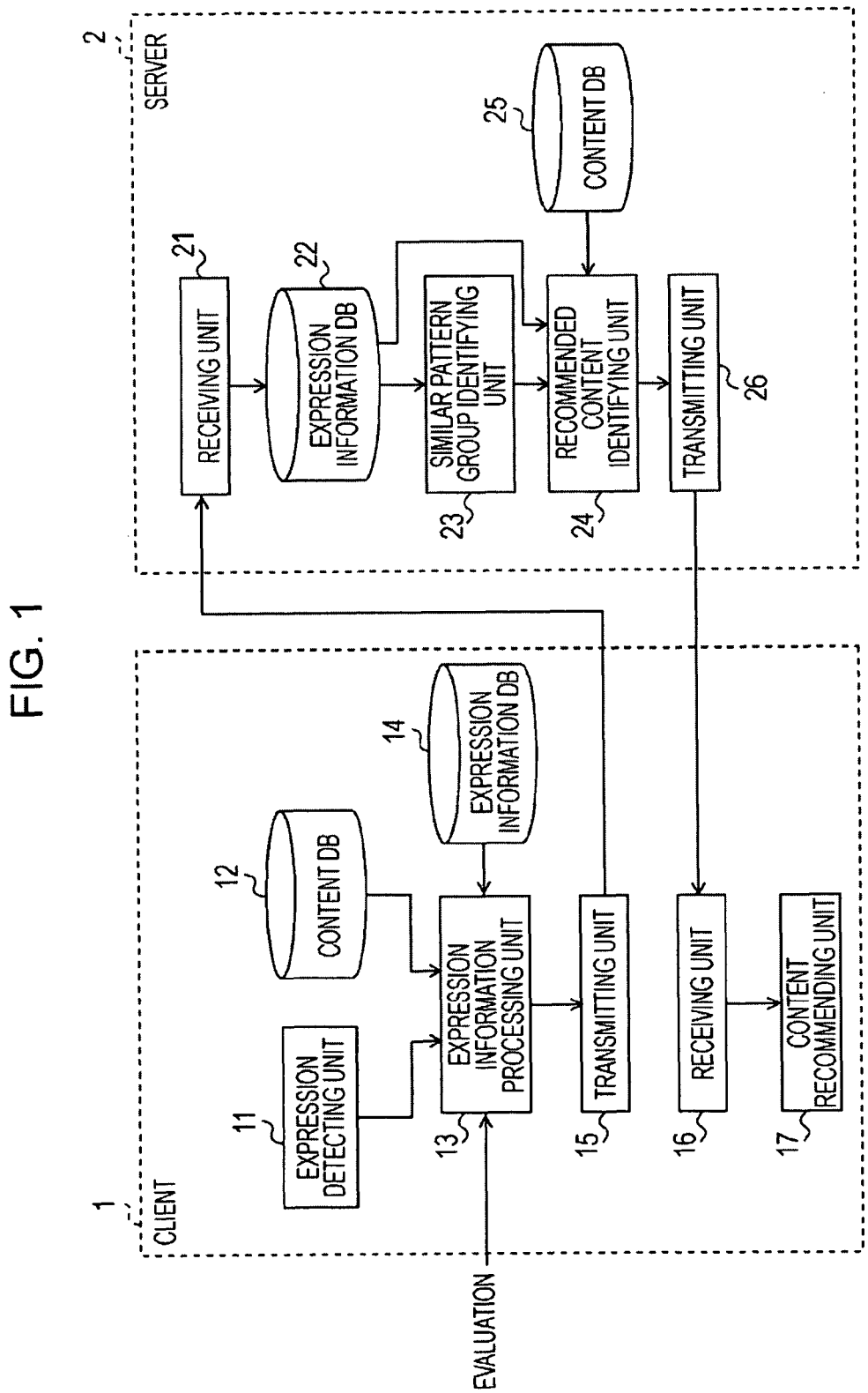
FIG. 1 is a block diagram illustrating a configuration example of a content recommendation system according to an embodiment of the present invention.

FIG. 1 is a block diagram showing a configuration example of a content recommendation system relating to an embodiment of the present invention. As shown in FIG. 1, the content recommendation system is configured by a client 1 and server 2 being connected via a network such as the Internet.

The client 1 is made up of an expression detecting unit 11, content database 12, expression information processing unit 13, expression information database 14, transmitting unit 15, receiving unit 16, and content recommending unit 17. On the other hand, the server 2 is made up of a receiving unit 21, expression information database 22, similar pattern group identifying unit 23, recommended content identifying unit 24, content database 25, and transmitting unit 26.

As described later, with the server 2, an arrangement is made wherein a group of users exhibiting similar expressions during content playback is identified, and content obtaining high evaluation by other users belonging to the same group as the user of client 1 is recommended as to a user of client 1 receiving a recommendation. That is to say, the server 2 is a device to perform content recommendation by collaborative filtering. The server 2 is connected to multiple terminals having similar configuration to that of the client 1, other than the client 1, via a network.

"Expression" is a user response which can be externally recognized by image or audio, such as facial expression such as smiling or frowning, speech such as talking to oneself or holding a conversation, movements such as clapping, rocking, or tapping, or a physical stance such as placing an elbow on the table or the upper body leaning. Dividing the users into groups and so forth is performed at the server 2 based on time-series data of such expressions.

The expression detecting unit 11 of the client 1 detects multiple types of expressions exhibited by the user at predetermined intervals, based on images obtained by photographing a user viewing/listening to content and user voice obtained by collecting audio during playback of content such as movies or television programs.

Figure 2:
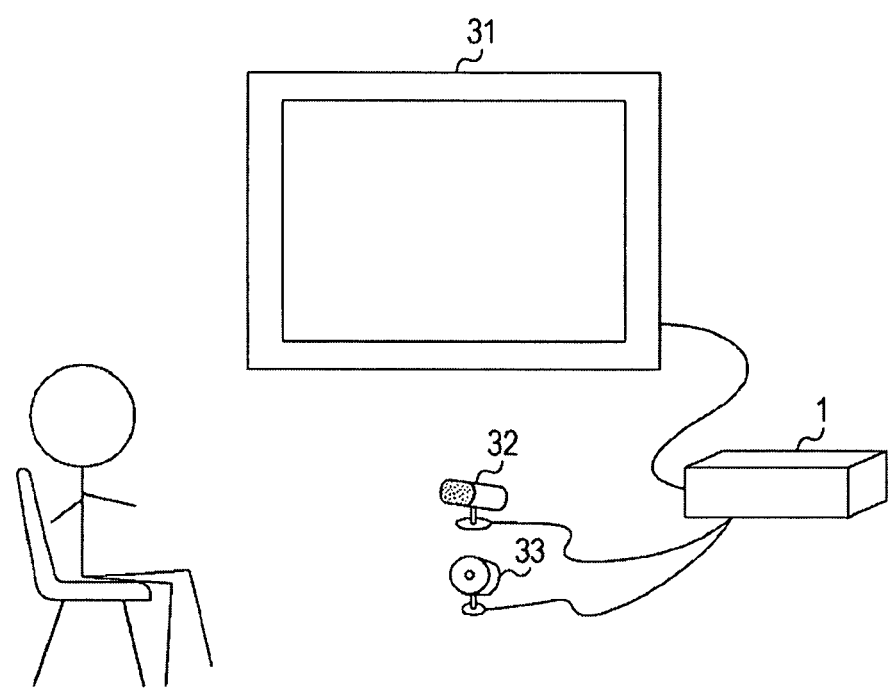
FIG. 2 is a diagram illustrating a state during content playback.

FIG. 2 is a diagram showing a state during content playback. In the example in FIG. 2, a television receiver 31, microphone 32, and camera 33 are connected to the client 1. The directionality of the microphone 32 and the photography range of the camera 33 are facing the user of the client 1 who is forward of the television receiver 31 and is sitting on a certain chair and viewing/listening to the content.

The picture of the content played back by the client 1 is displayed on the television receiver 31 and the audio of the content is output from a speaker of the television receiver 31. The voice of the user collected by the microphone 32 and the image of the user photographed by the camera 33 is supplied to the client 1.

For example, with the above-described smiling face, the range of the face of the user is detected from the image photographed by the camera 33, and the smiling face is detected by performing matching of the features extracted from the detected face and features of a smiling face prepared beforehand. With the expression detecting unit 11, time-series data showing the timing that the user has a smiling face and the degree of smiling (laughing out loud, grinning, and so forth) is obtained.

Similarly, with the above-described frowning face, the range of the face of the user is detected from the image photographed by the camera 33, and the frowning face is detected by performing matching of the features extracted from the detected face and features of a frowning face prepared beforehand. With the expression detecting unit 11, time-series data showing the timing that the user has a frowning face and the degree of frowning is obtained.

With speech such as talking to oneself or holding a conversation, the speaker is identified by performing speaker recognition subject to the audio collected by the microphone 32, and whether the collected audio is the user of the client 1 speaking to himself or is a conversation with another user viewing/listening to the content together is recognized, whereby the speech is detected. With the expression detecting unit 11, time-series data showing the timing of speech of the user and volume, which is the degree of speech, is obtained.

Clapping is detected based on the sound collected by the microphone 32. With the expression detecting unit 11, time-series data showing the timing of clapping of the user and strength and so forth, which is the degree of clapping, is obtained.

Other expressions also are detected based on data obtained by the microphone 32 and camera 33. The detection of the expression may be arranged such that the data obtained from the microphone 32 and camera 33 is temporarily recorded on a recording medium, then detection performed subject to the recorded data, or may be performed in real-time every time the data is supplied from the microphone 32 and camera 33.

Figure 3:
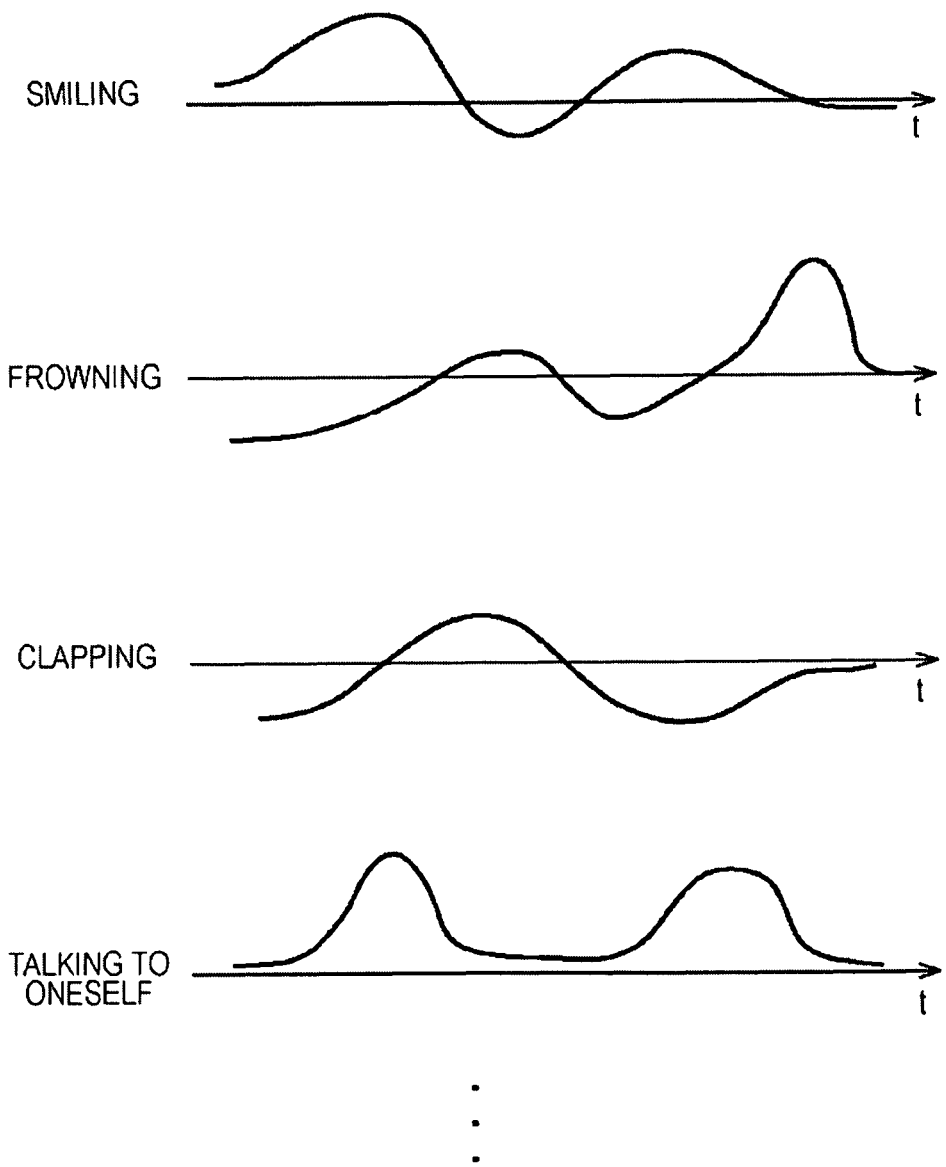
FIG. 3 is a diagram illustrating an example of time-series data of an expression.

FIG. 3 is a diagram showing an example of time-series data of the expressions detected by the expression detecting unit 11. FIG. 3 shows time-series data of smiling, frowning, clapping, and talking to oneself, in order from the top. The horizontal axis indicates time and the vertical axis indicates degree.

The expression detecting unit 11 outputs the expression information which is the time-series data of expressions thus detected to the expression information processing unit 13. With the client 1, multiple contents are played back, and expression information such as shown in FIG. 3 is obtained for each content played back.

With the expression information processing unit 13, the content stored in the content database 12 is read out and played back, and the picture or audio of content is output to the television receiver 31. The expression information processing unit 13 obtains expression information supplied sequentially from the expression detecting unit 11 during content playback, and stores this in the expression information database 14. Also, the expression information processing unit 13 obtains user evaluation of content. For example, upon the playback of one content ending, input of evaluation is requested as to the user. The user inputs an evaluation by operating a remote controller or mouse and so forth.

The expression information processing unit 13 corresponds the obtained user evaluation to expression information and stores this in the expression information database 14. The expression information database 14 has user evaluation and expression information obtained during content playback for each of multiple played-back content.

FIG. 4 is a diagram showing an example of information stored in the expression information database 14. With the example in FIG. 4, the evaluation as to content is a 5-level evaluation, and numbers expressing the evaluation as to each of the contents are set. Let us say that 5 represents the highest evaluation and 1 represents the lowest evaluation.

The evaluation as to content A is 5, and the evaluation thereof and the time-series data which is the smiling, frowning, clapping, and talking to oneself detected during playback of content A are correlated and stored.

Also, the evaluation as to content B is 2, and the evaluation thereof and the time-series data which is the smiling, frowning, clapping, and talking to oneself detected during playback of content B are correlated and stored. Similarly with content C, content D, and content E, the evaluation of each and the time-series data of expressions detected during playback are correlated and stored.

Returning to the description of FIG. 1, the expression information processing unit 13 identifies an expression that is a feature of a high evaluation content, based on the information stored in the expression information database 14, and sets the identified expression as a high evaluation index expression. For example, the expression information processing unit 13 focuses on the expression information of content with an evaluation of 5 in a 5-level evaluation, compares this to the expression information of content subjected to an evaluation of other than a 5-level evaluation, and identifies an expression significantly frequently included in the expression information of interest.

Expressions indicating amusement while viewing/listening to content may differ by user, e.g. a certain user may laugh often while viewing/listening to content the user finds amusing (high evaluation), and another user may clap hands often while viewing/listening to content the user finds amusing. With the expression information processing unit 13, the user of the client 1 and the expressions often exhibited by the user of the client 1 while viewing/listening to content the user finds amusing are linked together.

Specifically, the expression information processing unit 13 normalizes (z-conversion) the time-series data of N types of expressions for all of the content, and finds a representative value for each of the expressions. A representative value is obtained from the time-series data of each of the normalized and obtained expressions, and for example may be a maximum value of degree, a value showing frequency in which a value at or above a fixed value serving as a threshold value is detected, a value showing the time in which a value at or above a fixed value serving as a threshold value is continuously detected, and so forth.

Also, the expression information processing unit 13 compares the representative value of each of the expressions obtained from the expression information of the high evaluation content and the representative value of each of the expressions obtained from the expression information of content without a high evaluation, and the representative value with a clear difference identifies the expression found from the expression information of the high evaluation content. Determination of a clear difference can be made by using a standard such as statistical significance, or a difference of a particular ratio such as the value being greater than 20% or the like.

In the case of the example in FIG. 4, for each of the content of content A through E, a representative value of the time-series data for smiling, a representative value of the time-series data for frowning, a representative value of the time-series data for clapping, and a representative value of the time-series data for talking to oneself are obtained.

Also, of the representative values obtained from the time-series data of the expressions in content A and content D which is high evaluation content, a representative value having a clear difference when compared to the representative values obtained from the time-series data of the expressions in contents B, C, and E is obtained, and the expression having such representative value is identified as the expression of the high evaluation index.

The expression identified as a high evaluation index may be one type, or may be multiple types. Also, the expression herein is not identified by comparing the representative values obtained from the time-series data, but handles a time-series pattern as a change pattern, and the expression of the high evaluation index may be identified by performing data mining for a time-series pattern. Data mining for a time-series pattern is described in E. Keogh and S. Kasetty, "On the Need for Time Series Data Mining Benchmarks: A Survey and Empirical Demonstration", Data Mining and Knowledge Discovery, vol. 7, pp. 349-371 (2003), for example.

The expression information of the high evaluation index thus identified and the information showing the user evaluation as to each content and the user viewing/listening history are supplied from the expression information processing unit 13 to the transmitting unit 15.

The transmitting unit 15 transmits the expression information of the high evaluation index supplied from the expression information processing unit 13 and the information showing the user evaluation as to each content and the user viewing/listening history are transmitted to the server 2.

The receiving unit 16 receives information of the recommended content transmitted from the server 2, and outputs the received information to content recommended unit 17.

The content recommending unit 17 displays the recommended content identified by the server 2 to the television receiver 31 and so forth, based on the information supplied from the receiving unit 16, and presents this to the user.

Other than overall information such as the title and purchasing source of the recommended content, a thumbnail image of a portion (scene) of the recommended content likely to have a high evaluation for the user of the client 1 is displayed as recommended content information. With the server 2, a portion of the recommended content likely to have a high evaluation by the user of the client 1 may be identified.

The receiving unit 21 of the server 2 receives expression information of a high evaluation index transmitted from the transmitting unit 15 of the client 1 and information showing the user evaluation as to each content and the user viewing/listening history, and stores the received information in the expression information database 22.

As described above, the server 2 is connected to multiple terminals having a configuration similar to that of the client 1. By the information transmitted from each terminal being received, the expression information for the expression serving as a high evaluation index for each user and the user evaluation as to each content and the user viewing/listening history are stored in the expression information database 22.

The similar pattern group identifying unit 23 identifies users having similar evaluations, based on each user evaluation shown by the information stored in the expression information database 22. For example, whether or not the evaluation is similar or not is determined, for example, by obtaining the degree of matching of evaluation for the same content and comparing the obtained degree of matching with the threshold value.

FIG. 5 is a diagram showing an example of the user evaluation as to each content and the user viewing/listening history. FIG. 5 shows evaluations and viewing/listening history of users 1 through 5 as to contents A through G. Let us say that user 1 is the user of client 1. In FIG. 5, a circle indicates that viewing/listening has been finished and there is a high evaluation, and an X indicates that viewing/listening has been finished but there is not a high evaluation. An empty cell indicates untried content of which the user has not performed viewing/listening.

For example, the user 1 has viewed/listened to contents A, B, and E, and has given high evaluations as to the contents A and E, and has not given a high evaluation as to content B. Also, the user 2 has viewed/listened to contents A, D, E, and F, and has given high evaluations as to the contents A, D, and E, and has not given a high evaluation as to content F. The user 3 has viewed/listened to contents A, D, E, F, and G, and has given high evaluations as to the contents A, D, E, and G, and has not given a high evaluation as to content F. In this case, users 1 through 3 has given high evaluations to contents A and E which are the same content, and because the degree of matching is high, the users are identified as having similar evaluations.

Returning to the description in FIG. 1, the similar pattern group identifying unit 23 identifies a group of users with similar patterns of time-series data of high evaluation index expressions as to the same content, based on expression information stored in the expression information database 22. Even if the user has a different type of high evaluation index expression, if the time-series pattern data is similar the user belongs to the same group.

Users belonging to the same group may have different methods of expression, but are users with similar degrees of expression at the same portion (scene) during the same content playback, i.e. are users which feel amused, feel extremely amused, or feel unimpressed by the same sort of portions.

Whether or not the time-series data pattern of the high evaluation index expression is similar or not is determined, for example, by performing clustering with a predetermined method as to the time-series data pattern or obtaining a correlation between the time-series data patterns.

Figure 6:
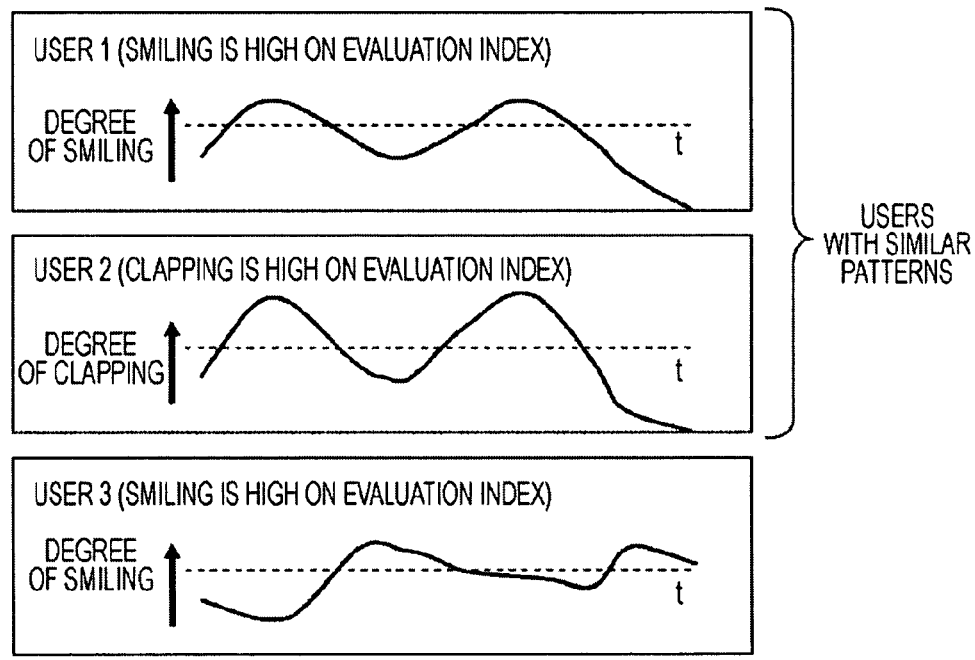
FIG. 6 is a diagram illustrating an example of time-series data of expression with a high evaluation index.

FIG. 6 is a diagram showing an example of time-series data of a high evaluation index expression as to content A. The example in FIG. 6 shows time-series data patterns for high evaluation index expressions of users 1 through 3. The user 1 which is the user of the client 1 is a user with a high evaluation index for smiling. The user 2 is a user with a high evaluation index for clapping, and the user 3 is a user with a high evaluation index for smiling.

In the case that the time-series data patterns for a high evaluation index expression of users 1 through 3 are such as shown in FIG. 6, the time-series data pattern for high evaluation index expressions of user 1 and the time-series data pattern for a high evaluation index expression of user 2 are similar, whereby the user 1 and user 2 are users belonging in the same group. Hereafter, as appropriate, a group of users whose time-series data patterns for high evaluation index expressions are similar as to the same content will be called a similar pattern group.

During playback of content A, even during similar portions, the user 1 laughs and the user 2 claps. The degree of laughing of the user 1 and the degree of clapping of the user 2 become similar degrees if normalized.

On the other hand, the user 1 and user 3 are not users in the same similar pattern group, so during playback of the content A, the user 1 and user 3 laugh at different portions or in different degrees.

The similar pattern group identifying unit 23 outputs the information of the users having similar evaluations thus identified and the information of the similar pattern group to the recommended content identifying unit 24.

The recommended content identifying unit 24 reads out time-series data for a high evaluation index of users belonging to the same similar pattern group, which is shown by the information supplied from the similar pattern group identifying unit 23, from the expression information database 22. The recommended content identifying unit 24 references the read out time-series data and identifies the portions with high evaluations within the entire content which the users with similar evaluations have given a high evaluation.

For example, a portion which more than a fixed number of users among users belonging to the same similar pattern group have given a high evaluation is identified as a high evaluation portion.

Figure 7:
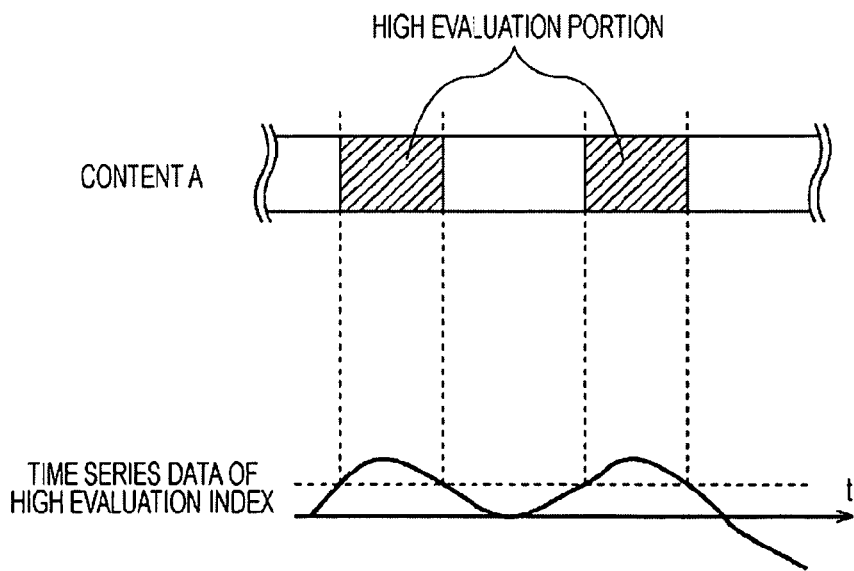
FIG. 7 is a diagram illustrating a identified example of a high evaluation portion.

FIG. 7 is a diagram showing a particular example of a portion with high evaluations. The band shown on the upper portion of FIG. 7 represents content A, and the waveform on the lower portion represents the time-series data for a high evaluation index of user 1 as to content A. The dotted line in the horizontal direction on the lower portion represents a threshold of degree.

For example, in the case that the user 1 which is the user of client 1 gives a high evaluation as to content A as described above, as shown in FIG. 7, in the case that the time-series data for a high evaluation index of user 1 is referenced, the portion wherein the degree of expression is larger than the threshold value, which is indicated by diagonal lines, is identified as a high evaluation portion.

Such identifying of a high evaluation portion is performed by referencing the time-series data for a high evaluation index of a user belonging to the same similar pattern group as the user 1. The portion of the content A for which more than a fixed number of users have given a high evaluation becomes a portion that is likely to be given a high evaluation by any user belonging to the same similar pattern group.

The time-series data for a high evaluation index of users belonging to the same similar pattern group is referenced, and the high evaluation portions are identified for each content as described above. Even if the content is the same, if the similar pattern group is different, the different portions are identified as high evaluation portions.

Also, the recommended content identifying unit 24 identifies other users belonging to the same similar pattern group as the user of the client 1 receiving content recommendation, based on information supplied from the similar pattern group identifying unit 23.

The recommended content identifying unit 24 identifies content which the user of the client 1 has not experienced, based on each user evaluation and viewing/listening history shown with the information stored in the expression information database 22, and which is content which identified other users have given a high evaluation, as recommended content. The identifying of recommended content is performed for example when a content recommendation is requested from the client 1 at a predetermined timing.

In the case that evaluations and viewing/listening history as shown in FIG. 5 are obtained, with the recommended content identifying unit 24, users 2 and 3 are identified as users having similar evaluations as the user 1 which is the user of the client 1, and user 2 is identified as a user with a similar time-series data pattern for a high evaluation index therein, as shown in FIG. 6.

Also, content D which the user 1 has not experienced and which the user 2 has given a high evaluation is identified as recommended content. Content G which has an evaluation similar to the user 1, but which user 3 with a dissimilar time-series data pattern for a high evaluation index has given a high evaluation is not selected as recommended content.

The recommended content identifying unit 24 reads out the information such as title, purchasing source, and overview from the content database 25, while reading out the thumbnail image of the leading frame of the recommended content high evaluation portion, which is identified as described above. The recommended content identifying unit 24 outputs the information read out to the transmitting unit 26. An arrangement may be made wherein a thumbnail is not used, and high evaluation portions are linked together to generate a digest of recommended content, and the generated digest is output. The transmitting unit 26 transmits the information supplied from the recommended content identifying unit 24 to the client 1.

Figure 8:
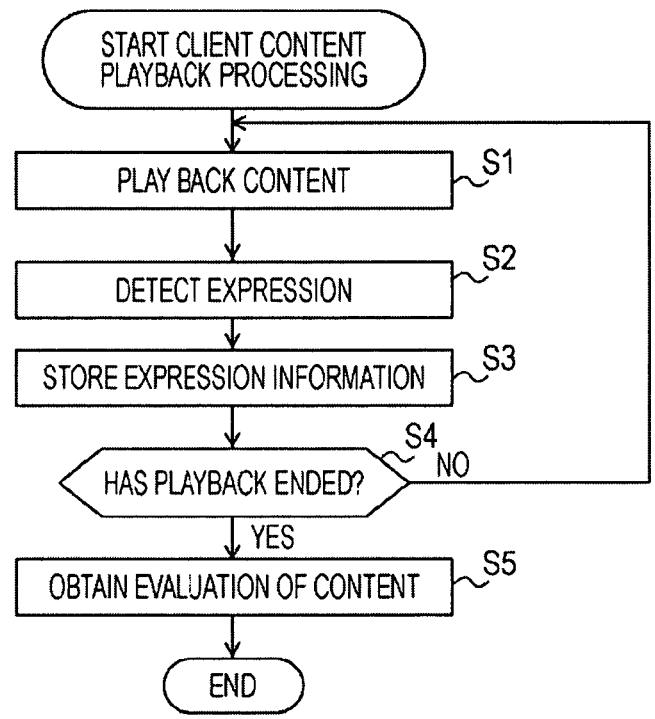
FIG. 8 is a flowchart describing content playback processing of a client.

Now, the processing between the client 1 and server 2 having the above-described configurations will be described. First, the processing of the client 1 which plays back content will be described with reference to the flowchart in FIG. 8. This processing is started, for example, when playback of predetermined content is instructed by a user.

In step S1, the expression information processing unit of the client 1 plays back content read out from the content database 12.

In step S2, the expression detecting unit 11 detects expressions of a user viewing/listening to content based on output from the microphone 32 and camera 33, and outputs the expression information to the expression information processing unit 13.

In step S3, the expression information processing unit stores the expression information supplied from the expression detecting unit 11 to the expression information database 14.

In step S4, the expression information processing unit determines whether or not the content playback has ended, and in the case determination is made of not ended, the flow is returned to step S1, and the processing above is repeated.

On the other hand, in the case that determination is made in step S4 that the content playback has ended, in step S5 the expression information processing unit 13 obtains an evaluation from the user as to the content that has been played back, and stores this in the expression information database 14 along with the expression information. After this, the processing is ended.

With the above description, a number input by the user is set as an evaluation as to the content, but an arrangement may be made wherein a high evaluation is set as to content subjected to operations likely to indicate high evaluation. For example, a high evaluation may be set as to content that is played back multiple times, content that is set to protect from deletion, and content that has been copied.

Also, an arrangement may be made wherein a high evaluation is set as to content including in metadata the same word as a word such as an actor name input as a keyword by the user to search for content. Various types of metadata such as title, sales source, actors, overview, and so forth are added to each content.

Further, an arrangement may be made wherein, in the case that the user of the client 1 has received content recommendation from the server 2, the user of the client 1 accepts the recommendation, and a high evaluation is set as to content having the same metadata as metadata of content subjected to a purchasing operation or playback operation.

Figure 9:
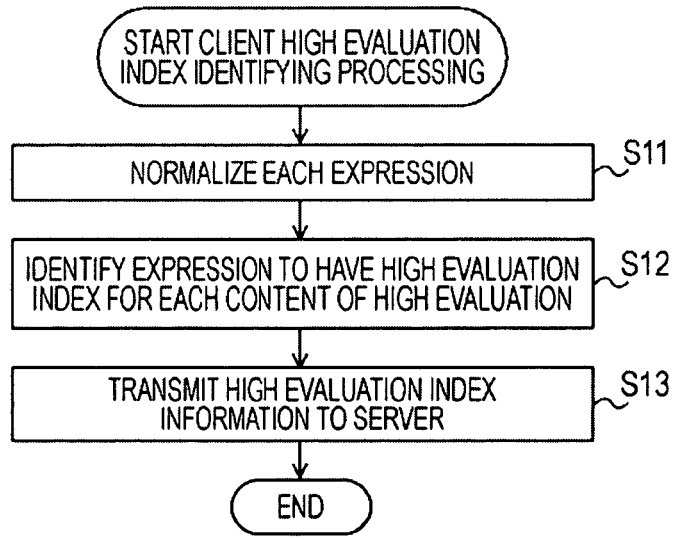
FIG. 9 is a flowchart describing high evaluation index identifying processing of a client.

Next, the processing of the client 1 identifying a high evaluation index expression will be described with reference to the flowchart in FIG. 9.

In step S11, the expression information processing unit 13 normalizes each time-series data of expression stored in the expression information database 14, and obtains the representative value of each expression.

In step 12, the expression information processing unit 13 compares the representative value of the expression obtained from the expression information of the high evaluation content and the representative value of the expression obtained from the expression information of the content without a high evaluation, and identifies the expression to be a high evaluation index for each high evaluation content. The expression information processing unit 13 outputs the identified high evaluation index expression information and the information showing user evaluation as to each content and user viewing/listening history to the transmitting unit 15.

In step S13, the transmitting unit 15 transmits the information supplied from the expression information processing unit 13 to the server 2, and ends the processing.

In the case that an expression to serve as a high evaluation index is not identified by the representative values being compared, and a word that is the same as a keyword used for searching in the past is included, an arrangement may be made wherein the expression featured in the already viewed/listened to content is identified as an expression to serve as a high evaluation index.

Also, in the case that the user of the client 1 has received the content recommended by the server 2, when the same metadata as the metadata of the content thereof is included in the content already viewed/listened to, an arrangement may be made wherein the expression featured in the already viewed/listened to content is identified as an expression to serve as a high evaluation index.

Figure 10:
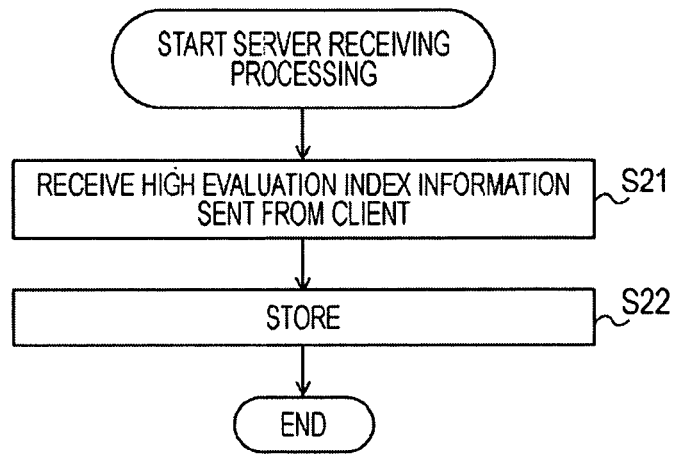
FIG. 10 is a flowchart describing receiving processing of a server.

Next, the processing of the server 2 to receive the information transmitted from the client 1 will be described with reference to the flowchart in FIG. 10.

In step S21, the receiving unit 21 of the server 2 receives the high evaluation index expression information transmitted from the client 1 and the information showing user evaluation as to each content and user viewing/listening history.

In step S22, the receiving unit 21 stores the received information in the expression information database 22, and ends the processing.

The above-described processing is performed each time information is transmitted from a terminal having a similar configuration to that of the client 1. High evaluation index expression information from multiple users, evaluations as to the content, and viewing/listening history information is stored in the expression information database 22 of the server 2.

Figure 11:
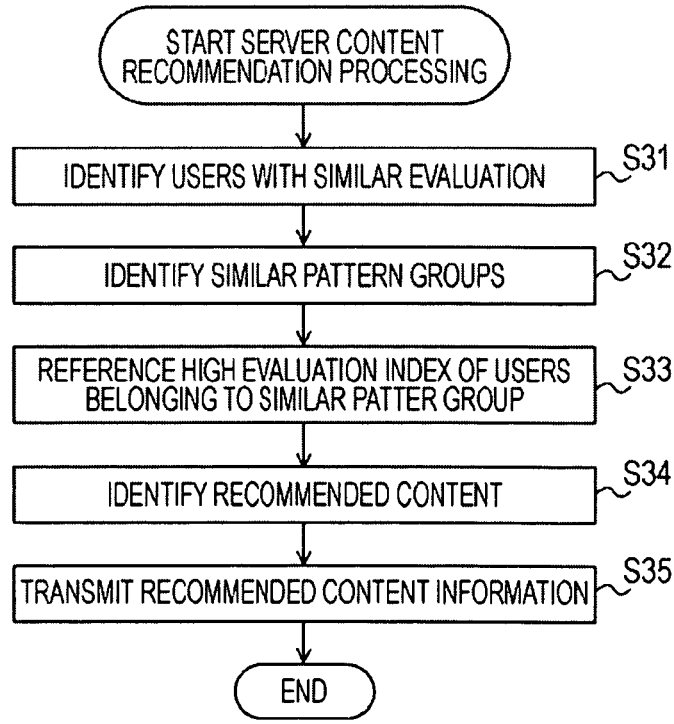
FIG. 11 is a flowchart describing content recommendation processing of a server.

Next, processing of the server 2 to perform content recommendation will be described with reference to the flowchart in FIG. 11.

In step S31, the similar pattern group identifying unit identifies users with similar evaluations based on user evaluations and viewing/listening history information stored in the expression information database 22.

In step S32, the similar pattern group identifying unit identifies a similar pattern group made up of users having similar time-series data patterns of the high evaluation index expressions as to the same content.

In step S33, the recommended content identifying unit 24 references the time-series data patterns for a high evaluation index of users belonging to the same similar pattern group to identify the high evaluation portion of the entire content of which high evaluation is given by users with similar evaluations.

In step S34, the recommended content identifying unit identifies content that the user of the client 1 has not experienced and that other users belonging to the same similar pattern group as the user of the client 1 have given a high evaluation as recommended content. The recommended content identifying unit 24 outputs the recommended content information to the transmitting unit 26.

In step S35, the transmitting unit 26 transmits the information supplied from the recommended content identifying unit 24 to the client 1, and ends the processing.

Figure 12:
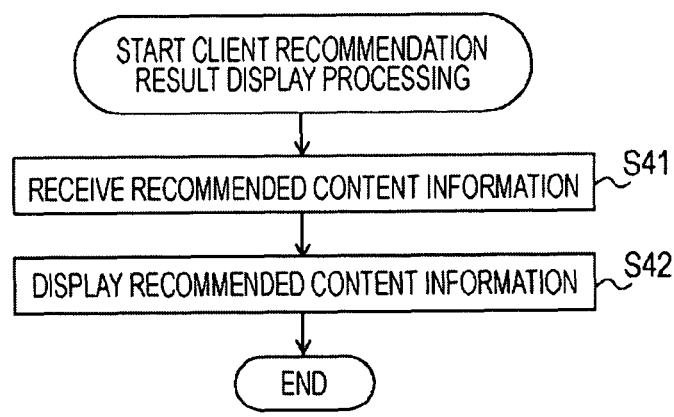
FIG. 12 is a flowchart describing recommendation result display processing of a client.

Next, processing of the client 1 to receive the information transmitted from the server 2 and display the recommendation results will be described with reference to the flowchart in FIG. 12. This processing is started when the recommended content information is transmitted from the server 2 in accordance with a request by the client 1.

In step S41, the receiving unit 16 of the client 1 receives the recommended content information transmitted from the server 2, and outputs the received information to the content recommending unit 17.

In step S42, the content recommending unit 17 displays the recommended content information transmitted from the server 2 on the television receiver 31, and presents this to the user. After this, the processing is ended.

With the above-described processing, the server 2 can perform collaborative filtering with consideration for each user expression and can recommend content.

With the above description, the high evaluation portion identified by referencing the time-series data for the high evaluation index of users belonging to the same similar pattern group has been used to obtain a thumbnail image serving as recommended content information or to generate a digest, but an arrangement may be made wherein information showing a high evaluation portion is added to the content as metadata.

Figure 13:
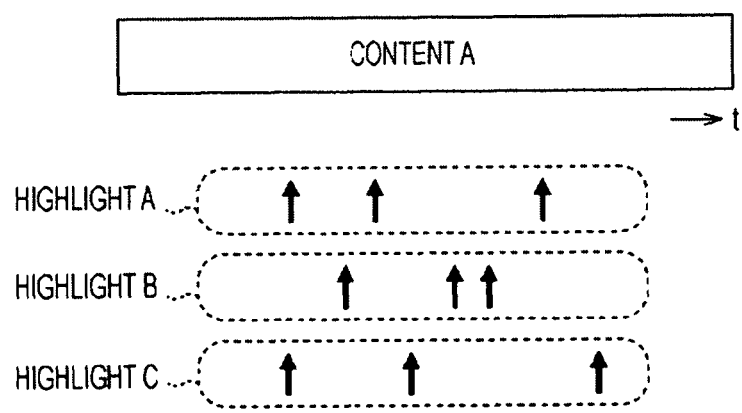
FIG. 13 is a diagram illustrating an example of metadata.

Thus, as shown in FIG. 13, metadata showing different portions for each similar pattern group is added as to the same content.

In FIG. 13, arrows facing upwards shown as highlight A shows the high evaluation portion of content A wherein the time-series data for the high evaluation index of the users belonging to group A which is the same similar pattern group is referenced and identified, arrows facing upwards shown as highlight B shows the high evaluation portion of content A wherein the time-series data for the high evaluation index of the users belonging to group B is referenced and identified. Arrows facing upwards shown as highlight C shows the high evaluation portion of content A wherein the time-series data for the high evaluation index of the users belonging to group C is referenced and identified.

Thus, metadata showing the same number of high evaluation portions as the number of similar pattern groups as to one content is added. The added metadata may be used to perform CBF (Content Based Filtering) filtering based on metadata added to the content or can be used to present the similar content. That is to say, not only is an overall evaluation made as to the content, but also highlights can be identified in the time-series, and highlights matching the user can be presented.

Also, with the above description, the identifying of the high evaluation index for the user of the client 1 is performed at the client 1, but an arrangement may be made wherein this is performed at the server 2. In this case, the expression information obtained be the client 1 is transmitted to the server 2, and is sued to identify the high evaluation index.

Figure 14:
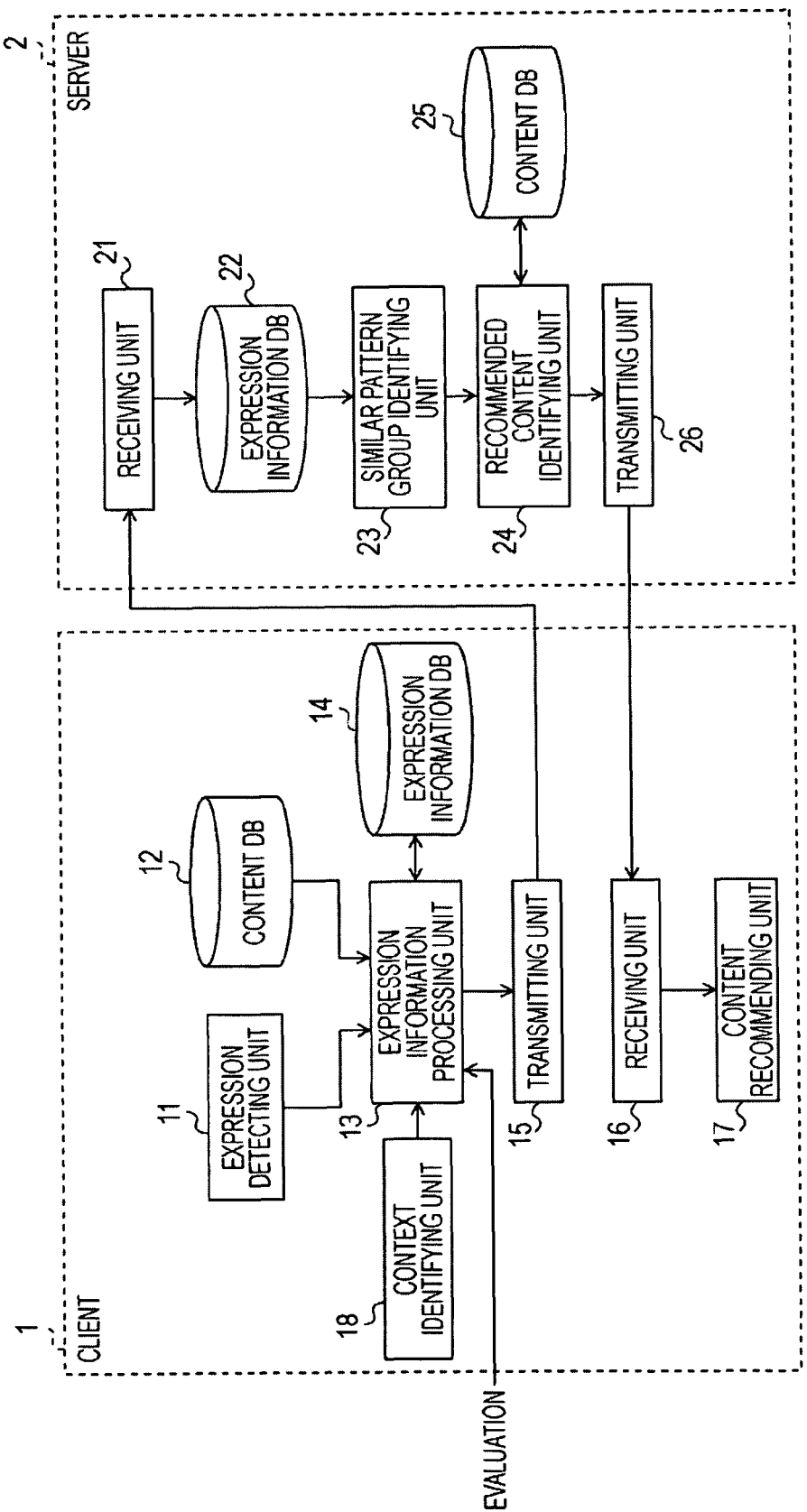
FIG. 14 is a block diagram illustrating another configuration example of a content recommendation system.

FIG. 14 is a block diagram showing another configuration example of the content recommending system. In FIG. 14, the same reference numerals are used for the same configuration as the configuration shown in FIG. 1. Duplicate descriptions will be omitted as appropriate.

The client 1 in FIG. 14 differs from the client 1 in FIG. 1 at the point of further having a context identifying unit 18. With the client 1 in FIG. 14, the context (situation) of when the content is being played back and the context of when the user of the client 1 receives content recommendation is identified by the context identifying unit 18.

The differences in context may include differences in the person one is viewing/listening to the content with, such as viewing/listening to the content with her husband, viewing/listening to the content with her child, viewing/listening to the content by herself, as well as differences in the room in which viewing/listening is taking place. That is to say, user expressions are likely to differ based on such context differences, whereby not only the above-described expressions but also context is taken into consideration and content recommendation and so forth is performed. The differences in context also are identified based on images photographed by the camera 33.

The expression detecting unit 11 of the client 1 detects multiple types of expressions made by the user based on images obtained by photographing the user viewing/listening to the content, or user voice obtained by collecting sound, for each user viewing/listening to the content, at a predetermined interval.

Figure 15:
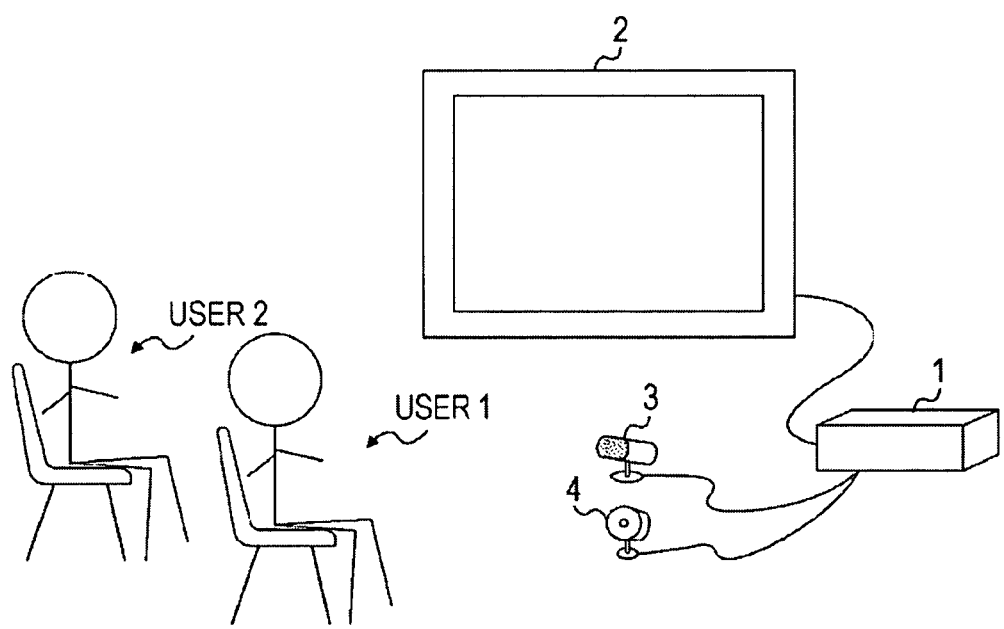
FIG. 15 is another diagram illustrating a state during content playback.

FIG. 15 is a diagram showing the situation during content playback. With the example in FIG. 15, the user 1 and user 2 are viewing/listening to the content together. In this case, the expressions of each of user 1 and user 2 are detected by the expression detecting unit 11.

Figure 16:
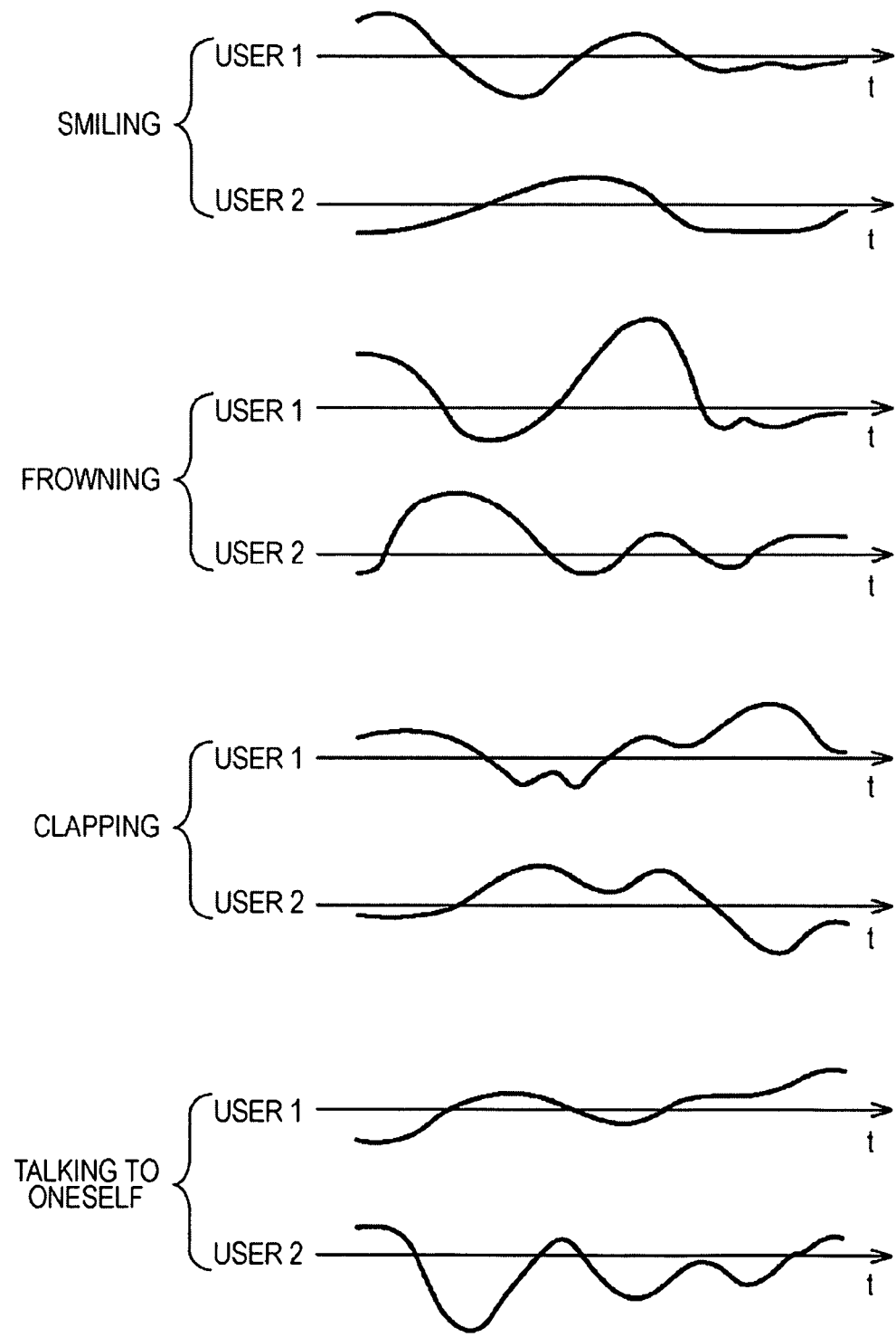
FIG. 16 is a diagram illustrating an example of time-series data of an expression.

FIG. 16 is a diagram showing an example of time-series data of expressions detected by the expression detecting unit 11. With the example in FIG. 16, time-series data for each expression of smiling, frowning, clapping, and talking to oneself is shown for each of user 1 and user 2.

Such expression information showing expressions for every user is obtained by the expression detecting unit 11, and supplied to the expression information processing unit 13.

Returning to the description of FIG. 14, the context identifying unit 18 performs image recognition using an image photographed with the camera 33 as the object thereof, and identifies context such as how many people are viewing/listening to the content together, and who the user is viewing/listening to the content with. Information used for identifying the context is provided beforehand to the context identifying unit 18. The context identifying unit 18 outputs the information showing identified context to the expression information processing unit 13.

The expression information processing unit 13 stores the expression information supplied from the expression detecting unit 11 in the expression information database 14 as different profiles, for each context identified by the context identifying unit 18. For example, even with the expression information for the same content, expression information is divided into the expression information worth when the viewing/listening is by oneself and the expression information worth when two people are viewing/listening, and stored in the expression information database 14.

The expression information processing unit 13 obtains user evaluation as to the content, corresponds the obtained evaluation with the expression information stored as profiles differing for each context, and stores this in the expression information database 14. The expression information processing unit 13 identifies a high evaluation index expression based on the evaluation stored in the expression information database 14 and the expression information stored as a different profile for each context. With the expression information processing unit 13, the expression serving as the high evaluation index can be identified for each context.

The transmitting unit 15 transmits the high evaluation index expression information for each context identified by the expression information processing unit 13 and the information showing the user evaluation as to each content and the user viewing/listening history to the server 2, and requests a content recommendation.

The receiving unit 16 receives the recommended content information transmitted from the server 2, and outputs the received information to the content recommendation unit 17.

The content recommendation unit 17 presents the recommended content information identified by the server 2 to the user, based on information supplied from the receiving unit 16.

The configuration on the server 2 side is the same configuration as the configuration of the server 2 shown in FIG. 1. That is to say, the receiving unit 21 of the server 2 receives high evaluation index expression information for each context transmitted from the transmitting unit 15 of the client 1, user evaluation as to each content, and information showing user viewing/listening history, and stores the received information in the expression information database 22.

The same number of profiles (expression information) as the number of contexts are collected for each person in the server 2.

The similar pattern group identifying unit 23 identifies users with similar evaluations and a similar pattern group, based on the information stored in the expression information database 22, and outputs the information of the users with similar evaluations and the information of the similar pattern groups in the recommended content identifying unit 24.

The recommended content identifying unit 24 references the time-series data for the high evaluation index of the users belonging to the same similar pattern group, and identifies the high evaluation portion of the entire content which the users having similar evaluations have given a high evaluation. Also, the recommended content identifying unit 24 identifies other users belonging to the same similar pattern group as the user of the client 1 receiving content recommendation.

The recommended content identifying unit 24 identifies content which the user of the client 1 has not experienced, and which other identified users have given a high evaluation as recommended content, and outputs the identified recommended content information to the transmitting unit 26.

Identification of similar pattern groups and so forth is performed based on the expression information handled as different profiles for each context, so the recommended content identified here takes into consideration the differences in context.

The transmitting unit 26 transmits the information supplied from the recommended content identifying unit 24 to the client 1.

Processing of the client 1 in FIG. 14 will be described. Note that the processing of the server 2 in FIG. 14 is basically similar processing as the processing in the server 2 in FIG. 1 as described above.

Figure 17:
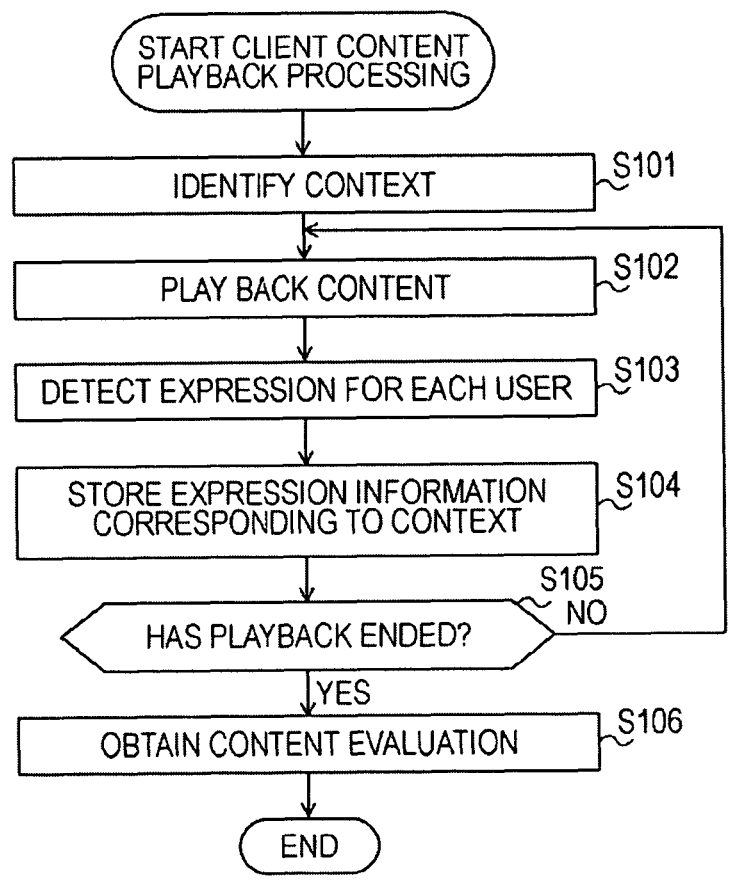
FIG. 17 is a flowchart describing content playback processing of a client.

First, processing of the client 1 that plays back the content will be described with reference to the flowchart in FIG. 17.

In step S101, the context identifying unit 18 of the client 1 identifies context based on the image photographed with the camera 33, and outputs the information showing identified context to the expression information processing unit 13.

In step S102, the expression information processing unit 13 plays back the content read out from the content database 12.

In step S103, the expression detecting unit 11 detects expressions for each user viewing/listening to content based on the output from the microphone 32 and camera 33, and outputs the expression information to the expression information processing unit 13.

In step S104, the expression information processing unit 13 stores the expression information supplied from the expression detecting unit 11 to the expression information database 14 for each context identified by the context identifying unit 18.

In step S105, the expression information processing unit 13 determines whether or not the content playback has ended, and in the case determination is made of not ended, the flow is returned to step S102, and the above processing is repeated.

On the other hand, in the case determination is made in step S105 that content playback has ended, in step S106 the expression information processing unit 13 obtains the user evaluation as to the played back content, and stores this in the expression information database 14 along with the expression information. After this, the processing is ended.

Figure 18:
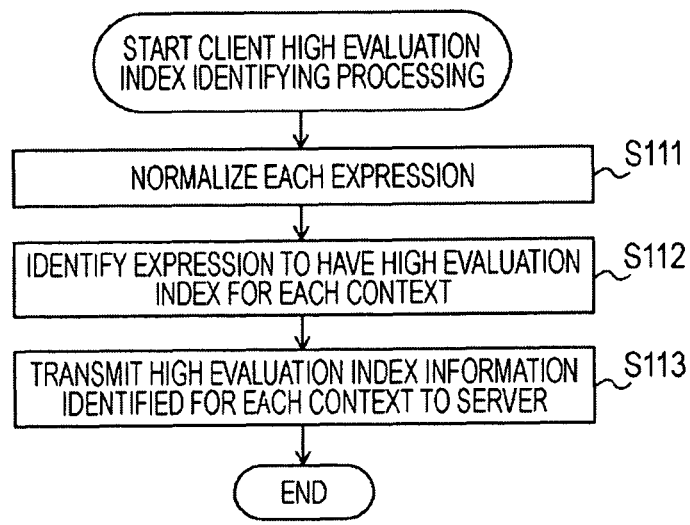
FIG. 18 is a flowchart describing high evaluation index identifying processing of a client.

Next, processing at the client 1 to identify the high evaluation index expressions will be described with reference to the flowchart in FIG. 18.

In step S111, the expression information processing unit 13 normalizes each of the time-series data of the expressions, and obtains a representative value for each expression.

In step S112, the expression information processing unit 13 compares the representative value of each expression obtained from the expression information of the high evaluation content and each representative value of the expressions obtained from the expression information of content without high evaluation, and identifies the expression to serve as a high evaluation index for each context.

In step S113, the transmitting unit 15 transmits the high evaluation index expression information identified for each context and the information showing user evaluation as to each content and the user viewing/listening history to the server 2, and ends the processing.

Figure 19:
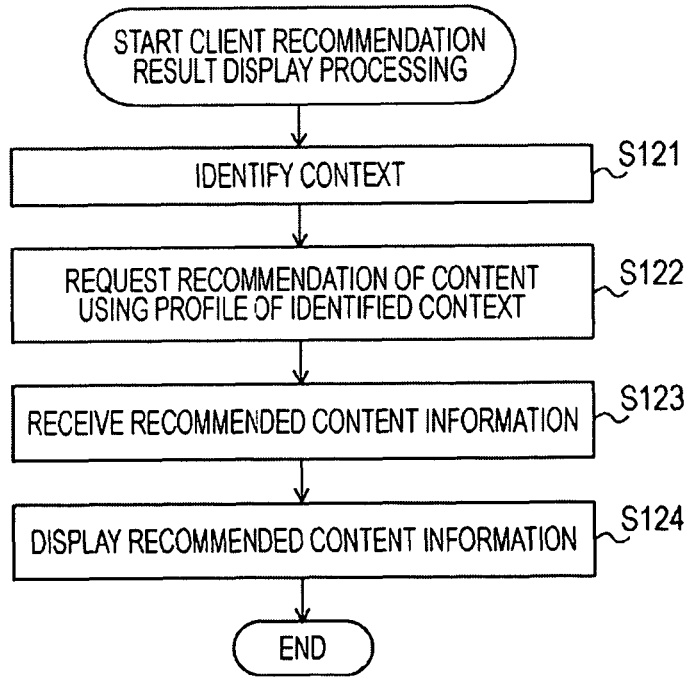
FIG. 19 is a flowchart describing recommendation result display processing of a client.

Next, processing for the client 1 to receive information transmitted from the server 2 and display the recommendation results will be described with reference to the flowchart in FIG. 19.

In step S121, the context identifying unit 18 of the client 1 identifies the context based on images photographed with the camera 33, and outputs the information showing identified context to the expression information processing unit 13.

In step S122, the expression information processing unit 13 controls the transmitting unit 15 and requests the server 2 to perform content recommendation using the profiles according to the context identified by the context identifying unit 18.

At the server 2, according to such request, identifying of recommended content is performed using the profiles according to the context identified by the context identifying unit 18 from the profiles provided from the client 1. The identified recommended content information is transmitted from the server 2 to the client 1.

In step S123, the receiving unit 16 of the client 1 receives recommended content information transmitted from the server 2 and outputs the received information to the content recommending unit 17.

In step S124, the content recommending unit 17 displays the recommended content information identified by the server 2, and presents this to the user. After this, the processing is ended.

With the above processing, the server 2 can perform collaborative filtering with consideration for context as well as each user expression to recommend content. Thus, an expression to serve as a high evaluation index is identified, which is used for identifying recommended content, but an arrangement may be made wherein not only expressions for a high evaluation index, but also expressions for a low evaluation index may be identified.

The information of expression serving as a low evaluation index is obtained by the server side, whereby, for example the server sequentially recommending the content can switch strategy to a different content each time an expression serving as a low evaluation index is detected to recommend content.

Also, with a server providing Internet shopping services, an arrangement may be made wherein, for each user, the expressions leading to a final purchase and expressions not leading to a purchase are distinguished and managed, and when a pattern becomes that of not leading to a purchase, the strategy for recommendation is immediately changed.

Further, an arrangement may be made as a method for researching viewing/listening rates, wherein determination is made on the client side from the user expression as to whether the user is enjoyably watching the content or forcibly watching, and calculations are made of the ratio of the user watching enjoyably and the ratio of the user watching forcibly, enabling computing a viewing/listening rate (high sensitivity) with an expression base.

The above-described processing can be realized using time-series data of biometric responses exhibited by the user while viewing/listening to the content instead of time-series data of expressions. In this case, the measuring devices to measure the biometric responses such as pulse and brain waves are attached to the body of the user viewing/listening to the content, whereby time-series data of biometric responses are obtained.

Biometric responses also are likely to show sensitivity of the user as to the content, similar to expressions, whereby using time-series data of biometric responses also enable realizing the above-described processing.

The above-described series of processing can be executed with hardware and can also be executed with software. In the case of executing the series of processing with software, the program making up such software is installed from a program recording medium into a computer built into dedicated hardware or a general-use personal computer that can execute various types of functions by installing various types of programs.

Figure 20:
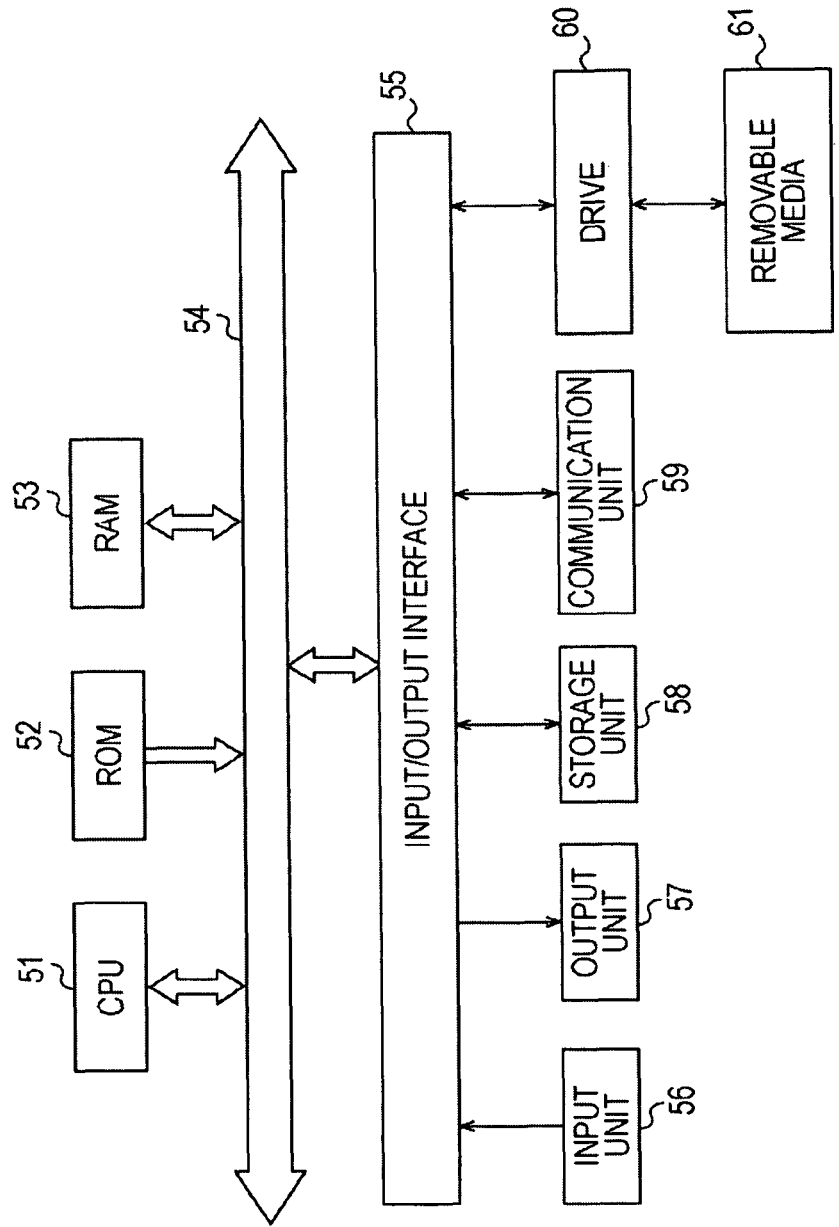
FIG. 20 is a block diagram illustrating a hardware configuration example of a computer.

FIG. 20 is a block diagram showing a configuration example of hardware of a computer executing the above-described series of processing with a program. At least a portion of the configuration of the client 1 and server 2 shown in FIGS. 1 and 14 can be realized by predetermined programs being executed by a CPU (Central Processing Unit) 51 of a computer having a configuration such as shown in FIG. 20.

The CPU 51, ROM (Read Only Memory) 52, and RAM (Random Access Memory) 53 are mutually connected with a bus 54. The bus 54 is further connected to an input/output interface 55. The input/output interface 55 is connected to an input unit 56 made up of a keyboard, mouse, microphone, and so forth, an output unit 57 made up of a display, speaker, and so forth, a storage unit 58 made up of a hard disk or non-volatile memory, and so forth, a communication unit 59 made up of a network interface and so forth, and a drive 60 to drive a removable media 61 such as an optical disk or semiconductor memory.

With a computer thus configured, for example the CPU 51 loads to the RAM 53 and executes the program stored in the storage unit 58 via the input/output interface 55 and bus 54, whereby the above-described series of processing can be performed.

The program that the CPU 51 executes can be recorded on a removable media 61, for example, or provided via a cable or wireless transfer medium such as a local area network, Internet, or digital broadcast, and installed in the storage unit 58. The program that the computer executes may be a program wherein processing is performed in a time-series matter along the sequences described in the present identification, or may be a program wherein processing is performed in parallel, or at an appropriate timing when called up.

The embodiments of the present invention are not restricted to be above-described embodiments, and various types of modifications can be made within the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
a storage device; and
at least one processor coupled to the storage device, wherein the storage device stores a program for controlling the at least one processor, and wherein the at least one processor, being operative with the program, is configured to:
receive information associated with high-evaluation content and first time-series data identifying an expression exhibited by a first user during playback of the high-evaluation content, wherein:
the high-evaluation content is associated with an evaluation value that exceeds a threshold value;
the evaluation value is provided by the first user subsequent to the playback of the high-evaluation content; and
the first time-series data is indicative of a temporal variation of the expression of the first user during the playback of the high-evaluation content;
identify, based on the first time-series data, one or more additional users that exhibited an expression similar to the expression of the first user during playback of content similar to the high evaluation content;
identify as recommended content comprising at least one element of content that received a corresponding evaluation value from the one or more additional users that exceeds the threshold value; and
transmit information associated with the recommended content to an information processing terminal.

2. The information processing device of claim 1, wherein the at least one processor is further configured to:
receive information expressing viewing/listening history of content which is transmitted from the information processing terminal;
determine, based on the viewing/listening history, whether the first user has experienced the at least one content element; and
identify the at least one content element as the recommended content when the first user has not experienced the at least one content element.

3. The information processing device of claim 1, wherein the at least one processor is further configured to:
determine that the evaluation value provided by the first user for the at least one content element is similar to corresponding evaluation values provided by the one or more additional users; and
identify the at least one content element as the recommended content, based on the determination.

4. The information processing device of claim 3, wherein the at least one processor is further configured to reference and identify a portion of the high-evaluation content associated with the expression of the one or more additional users that is similar to the first user expression.

5. The information processing device of claim 1, wherein:
the high-evaluation content is associated with a plurality of contexts; and
the at least one processor is further configured to:
receive second time-series data identifying expressions corresponding to the contexts and exhibited by the first user during playback of the high-evaluation content, and
identify, based on the second time-series data, the one or more additional users that exhibited an expression similar to the first user expression during playback of content having contexts similar to the contexts of the high-evaluation content.

6. An information processing method, comprising the steps of:
receiving information associated with high-evaluation content and first time-series data identifying an expression exhibited by a first user during playback of the high-evaluation content, wherein:
the high-evaluation content is associated with an evaluation value that exceeds a threshold value;
the evaluation value is provided by the first user subsequent to the playback of the high-evaluation content; and
the first time-series data is indicative of a temporal variation of the expression of the first user during the playback of the high-evaluation content;
identifying, based on the first time-series data, one or more additional users that exhibited an expression similar to the expression of the first user during playback of content similar to the high evaluation content;
identifying as recommended content comprising at least one element of content that received a corresponding evaluation value from the one or more additional users that exceeds the threshold value; and
transmitting the information associated with the recommended content to an information processing terminal.

7. A tangible, non-transitory computer-readable medium storing instructions that, when executed by at least one processor, cause the at least one processor to perform a method comprising the steps of:
receiving information associated with high-evaluation content and first time-series data identifying an expression exhibited by a first user during playback of the high-evaluation content, wherein:
the high-evaluation content is associated with an evaluation value that exceeds a threshold value;
the evaluation value is provided by the first user subsequent to the playback of the high-evaluation content; and
the first time-series data is indicative of a temporal variation of the expression of the first user during the playback of the high-evaluation content;
identifying, based on the first time-series data, one or more additional users that exhibited an expression similar to the expression of the first user during playback of content similar to the high evaluation content;
identifying as recommended content comprising at least one element of content that received a corresponding evaluation value from the one or more additional users that exceeds the threshold value; and
transmitting the information associated with the recommended content to an information processing terminal.

8. An information processing terminal, comprising:
a storage device; and
at least one processor coupled to the storage device, wherein the storage device stores a program for controlling the at least one processor, and wherein the at least one processor, being operative with the program, is configured to:
detect a plurality of types of expressions exhibited by a first user during playback of a plurality of content elements;
obtain, from the user, values indicating an evaluation of corresponding ones of the content elements subsequent to playback
identify a subset of the content elements associated with evaluation values that exceed a threshold value; and
identify at least one of the expression types exhibited by the user during playback of the subset of content elements as an indicator of high-evaluation content; and
transmitting means configured to transmit, to an information processing device, time-series expression data associated with the indicator and information associated with the subset of the content elements, the time-series expression data being indicative of a temporal variation of the at least the identified expression type during playback of at least the subset of content elements.

9. The information processing terminal of claim 8, wherein the at least one processor is further configured to:
receiving means configured to receive recommended content information transmitted from the information processing device; and
recommending means configured to display recommended content to the first user, based on information received by the receiving means.

10. The information processing terminal of claim 8, wherein the at least one processor is further configured to:
identify context during content playback,
to identify the indicator of high-evaluation content from a plurality of types of expressions associated with the identified context.

11. An information processing method, comprising the steps of:
detecting a plurality of types of expressions exhibited by a user during playback of a plurality of content elements;
obtaining, from the user, values indicating an evaluation corresponding ones of the content elements subsequent to playback;
identifying a subset of the content elements associated with evaluation values that exceed a threshold value;
identifying at least one of the expression types exhibited by the user during playback of the subset of content elements as an indicator of high-evaluation content; and
transmitting time-series expression data associated with the indicator and information associated with the subset of the content elements to an information processing device, the time-series expression data being indicative of a temporal variation of the at least the identified expression type during playback of at least the subset of content elements.

12. A tangible, non-transitory computer-readable medium storing instructions that, when executed by at least one processor, cause the at least one processor to perform, a method comprising the steps of:
detecting a plurality of types of expressions exhibited by a user during playback of a plurality of content elements;
obtaining, from the user, values indicating an evaluation corresponding ones of the content elements subsequent to playback;
identifying a subset of the content elements associated with evaluation values that exceed a threshold value;
identifying at least one of the expression types exhibited by the user during playback of the subset of content elements as an indicator of high-evaluation content; and
transmitting time-series expression data associated with the indicator and information associated with the subset of the content elements to an information processing device, the time-series expression data being indicative of a temporal variation of the at least the identified expression type during playback of at least the subset of content elements.

13. An information processing device, comprising:

a receiving unit configured to receive information associated with high-evaluation content and time-series data identifying an expression exhibited by a first user during playback of the high-evaluation content, wherein:

the high-evaluation content is associated with an evaluation value that exceeds a threshold value;

the evaluation value is provided by the first user subsequent to the playback of the high-evaluation content; and the time series data is indicative of a temporal variation of the expression of the first user during the playback of the high-evaluation content;

identify, based on the time-series data one or more additional users that exhibited an expression similar to the expression of the first user during playback of content similar to the high evaluation content;

a recommended content identifying unit configured to identify recommended content comprising at least one element of content that received a corresponding evaluation value from the one or more additional users that exceeds the threshold value other users exhibiting expressions similar to the; and a transmitting unit configured to transmit information associated with the recommended content to an information processing terminal.

14. An information processing terminal, comprising:

expression detecting unit configured to detect a plurality of types of expressions exhibited by a first user during playback of a plurality of content elements;

a identifying unit configured to:

obtain, from the user, values indicating an evaluation of corresponding ones of the content elements subsequent to playback;

identify a subset of the content elements associated with evaluation values that exceed a threshold value; and identify at least one of the expression types exhibited by the user during playback of the subset of content elements as an indicator of high-evaluation content; and a transmitting unit configured to transmit, to an information processing device, time-series expression data associated with the indicator and information associated with the subset of the content elements, the time-series expression data being indicative of a temporal variation of the at least the identified expression type during playback of at least the subset of content elements.

* * * * *